US012258640B2

(12) United States Patent
Allam (10) Patent No.: US 12,258,640 B2
(45) Date of Patent: Mar. 25, 2025

(54) SYSTEMS AND METHODS FOR IMPROVED CARBON CAPTURE ASSOCIATED WITH MOLTEN METAL PRODUCTION

(71) Applicant: 8 Rivers Capital, LLC, Durham, NC (US)

(72) Inventor: Rodney John Allam, Lanhill (GB)

(73) Assignee: 8 Rivers Capital, LLC, Durham, NC (US)

(*) Notice: Subject to any disclaimer, the term of this patent is extended or adjusted under 35 U.S.C. 154(b) by 0 days.

(21) Appl. No.: 18/421,103

(22) Filed: Jan. 24, 2024

(65) Prior Publication Data

US 2024/0247327 A1 Jul. 25, 2024

Related U.S. Application Data

(60) Provisional application No. 63/441,060, filed on Jan. 25, 2023.

(51) Int. Cl.
*C21B 7/00* (2006.01)
(52) U.S. Cl.
CPC ........ *C21B 7/002* (2013.01); *C21B 2100/282* (2017.05); *C21B 2100/62* (2017.05); *C21B 2100/66* (2017.05)
(58) Field of Classification Search
CPC .............. C21B 7/002; C21B 2100/282; C21B 2100/62; C21B 2100/66; C21B 2100/26; C21B 2100/44; C21B 2100/64; C21B 13/0073; C21B 5/06; B01D 2257/302; B01D 2257/404; B01D 2257/504;

(Continued)

(56) References Cited

U.S. PATENT DOCUMENTS

| 4,917,727 A | 4/1990 | Saito et al. |
| 6,523,348 B1 * | 2/2003 | Acharya ................... C21B 5/00 60/671 |
| 8,133,298 B2 | 3/2012 | Lanyi et al. |

(Continued)

FOREIGN PATENT DOCUMENTS

| DE | 1219054 | | 6/1966 | |
| GB | 2261225 A | * | 5/1993 | ............... C10J 3/00 |
| JP | H04311632 A | | 11/1992 | |

OTHER PUBLICATIONS

Encyclopaedia Britannica, Blast Furnace, Jul. 18, 2024 (Year: 2024).*

(Continued)

*Primary Examiner* — Brian D Walck
*Assistant Examiner* — Danielle M. Carda
(74) *Attorney, Agent, or Firm* — Womble Bond Dickinson (US) LLP (57) ABSTRACT

The present disclosure relates to systems and methods for the production of molten metals direct oxidative combustion of one or more solid fuels. The systems and methods may be combined with coal gasifiers and related components for reducing overall energy requirements as well as external fuel sources, e.g., through the use of endogenously-generated hydrogen. In beneficial aspects, components of the carbonaceous exhaust produced in accordance with the disclosed systems and methods, such as carbon dioxide ($CO_2$), may be isolated using carbon capture and sequestration (CCS) for reducing associated greenhouse gas emissions.

14 Claims, 4 Drawing Sheets

(58) Field of Classification Search
CPC .......... B01D 2257/80; B01D 2258/025; B01D 53/62; B01D 53/75; B01D 53/78; C22B 9/05
USPC .......................................................... 75/468
See application file for complete search history.

(56) References Cited

U.S. PATENT DOCUMENTS

| | | | |
|---|---|---|---|
| 8,557,173 | B2 | 10/2013 | Lanyi et al. |
| 8,992,663 | B2 | 3/2015 | Menzel |
| 9,222,042 | B2 | 12/2015 | Millner et al. |
| 10,526,670 | B2 | 1/2020 | Kuhl |
| 2020/0346165 | A1* | 11/2020 | Lu ........................... C01B 32/55 |

OTHER PUBLICATIONS

Hydrogen Association, Hydrogen, Production from Coal, Fact Sheet (Year: 2006).*

* cited by examiner

SYSTEMS AND METHODS FOR IMPROVED CARBON CAPTURE ASSOCIATED WITH MOLTEN METAL PRODUCTION

CROSS-REFERENCE TO RELATED APPLICATIONS

This application claims the benefit of and priority to U.S. Provisional Patent Application No. 63/441,060, filed Jan. 25, 2023, and entitled "Systems and Methods for Improved Carbon Capture Associated with Molten Metal Production," the contents of which being incorporated herein by reference in their entirety.

FIELD OF THE DISCLOSURE

The present disclosure provides systems and methods for the production of molten metals with carbon capture. In particular, the systems and methods can provide for direct oxidative combustion using one or more solid fuels, while the carbon dioxide ($CO_2$) fraction produced therefrom may be utilized in a semi-closed power generation cycle and/or isolated using carbon capture and sequestration (CCS).

BACKGROUND

The endothermic processes associated with carbonaceous fuel combustion are generally characterized by energy intensive reactions that are associated with significant levels of $CO_2$ emissions. These emission levels are further exacerbated in processes associated with the melting and smelting of many industrial materials, particularly metal ores such as iron ore, which melts at about 2800° F. (about 1538° C.). Such processes are often carried out in metallurgical furnaces such as blast furnaces, wherein solid fuels may be combined with metal ores such as iron ore in the presence of oxygen for rapidly melting the metal ore(s) of interest. However, blast furnaces are disadvantageously characterized by large operational energy requirements as well as significant greenhouse gas emissions, including $CO_2$. Accordingly, there remains a need for energy efficient molten metal production processes further capable of reducing the carbonaceous emissions associated therewith.

BRIEF SUMMARY

The present disclosure provides solutions to the above-mentioned challenges attributable to thermal and chemical emissions associated with metallurgical production processes. In one or more embodiments, the present disclosure provides a system for producing molten metal with carbon sequestration. In certain features, the system comprises a reactor configured to receive a fuel, a metal ore, an oxidant, and a reducing gas for the production of, at least, a molten metal product and a top gas that includes carbon dioxide ($CO_2$) and at least one combustible component. For example, the reactor may consist of a blast furnace, including a hot blast furnace or a cold blast furnace, a steelmaking furnace such as a puddling furnace, a reverberatory furnace, an open hearth furnace, a basic oxygen furnace, and an electric arc furnace. In certain aspects, the combustible component consists of a fuel having a high carbon content such as coke, including petroleum coke (alternatively referred to as petcoke), as well as coke dust.

In some embodiments, the system comprises a combustor that is arranged or positioned downstream of the reactor and configured to receive at least a portion of 1) the top gas that includes $CO_2$; and 2) the combustible component(s) to produce a combustion product stream, which may alternatively be referred to as a combustion product flow. For instance, the top gas stream may comprise at least about 20% by volume $CO_2$, including at least about 25% by volume, and at least about 30% by volume. Additionally, the top gas stream may further comprise one of more of hydrogen ($H_2$), nitrogen ($N_2$), carbon monoxide (CO), and water ($H_2O$). For example, in non-limiting aspects, the top gas stream may comprise about 32% by volume $CO_2$, about 45% by volume CO, about 5% by volume $H_2$, about 14% by volume $N_2$, and about 1% by volume $H_2O$.

In some embodiments, the system may comprise a heat exchanger that is arranged or positioned downstream of the combustor and configured for receiving at least a portion of a combustion product stream, such as the combustion product stream described in the foregoing. The heat exchanger may be arranged for best removing heat from a combustion product stream for producing a cooled combustion product stream. In related aspects, the process associated with cooling the combustion product stream using a heat exchanger beneficially provides thermal energy for heating $CO_2$ produced within the system, as further described below. Additional features of the system may include one or more processing components that are arranged or positioned downstream of the heat exchanger and configured to process the cooled combustion product stream described in the foregoing as well as to optionally heat at least a portion of the carbon dioxide ($CO_2$) present in the cooled combustion product stream for supplying sufficient energy for an optional power generation cycle, as further described below. In certain embodiments, the one or more processing components are advantageously capable of sequestering all of the $CO_2$ residing in the cooled combustion product stream.

The system, in further aspects, comprises a source for supplying reducing gas, such as a coal gasifier or related high temperature, high pressure apparatus capable of incinerating a fuel source and producing a gaseous stream comprising a reducing gas such as hydrogen ($H_2$). For instance, $H_2$ may be produced via the sufficient heating of coal fuel in a coal gasifier, along with carbon monoxide (CO), carbon dioxide ($CO_2$) and water ($H_2O$). The resulting $H_2O$ may be subsequently treated, e.g. using a CO shift reactor, pressure-swing absorber (PSA), or similar components, that may be arranged downstream from the coal gasifier and operable, in aspects, to produce additional $H_2$ that, along with the hydrogen produced via coal burning, may be introduced into the system reactor for fueling incineration of the coke as described in the foregoing. In related aspects, the system may comprise a catalytic shift reactor that is arranged or positioned downstream from the coal gasifier and upstream from the PSA, and may further comprise one or more components arranged downstream from the PSA that are configured to isolate carbon-based components produced from the coal gasifier, including but not limited to carbon monoxide (CO) and carbon dioxide ($CO_2$).

In additional embodiments, the system may comprise a filter component that is configured and positioned for removing at least a portion of any solids present in the combustion product stream and/or the output stream from the furnace, including, e.g., solids that may be produced during combustion of the fuel in the reactor, including ash, unreacted coke fuel, etc. The system may be further equipped with a compressor that is arranged or positioned downstream of a filter component. In non-limiting aspects, the compressor may be selected on the basis of and/or configured for compressing a filtered, gaseous exhaust stream, with at least a portion of the filtered, gaseous exhaust stream comprising one or more carbonaceous species such as carbon dioxide ($CO_2$). In related aspects, a compressor may be selected from any commercially-available and/or modifiable compression unit, including a single-stage compressor or a multi-stage compressor, capable of compressing a $CO_2$ in accordance with the instant disclosure.

The system may, in one or more embodiments, still further comprise a water separator that is arranged or positioned downstream from the heat exchanger, which may be arranged and operated for best removing heat from a combustion product stream for subsequently producing a cooled combustion product stream as described above. Accordingly, the water separator may be configured for receiving and treating the cooled combustion product stream to produce, in some embodiments, a substantially pure $CO_2$ stream that is at least partially or substantially free of water ($H_2O$).

In further embodiments, the disclosed system may comprise a compressor that is arranged or positioned downstream from the water separator. The compressor may comprise any commercially available compressor or modified compressor capable of compressing a gaseous stream. In particular aspects, the compressor is used to sufficiently compress a substantially pure $CO_2$ stream that is partially or substantially free of $H_2O$ following treatment by the water separator. In alternative aspects, the substantially pure $CO_2$ stream may further be cooled to a temperature below ambient following drying and compression, temperature, e.g., the $CO_2$ stream may be cooled to a temperature in a range of about 2° C. to about 10° C.

Embodiments of the disclosed systems further relate to the endogenous production of energy, i.e., energy that is produced during the operation of the system, that may advantageously reduce some or all of the requirements for incorporating external power sources or energy. Alternatively, the endogenously produced energy may be utilized, e.g., for an external system in operable contact with the present system. Thus, in related aspects the system may further comprise a turbine for power production downstream from the compressor. The turbine may comprise any commercially available or modified turbine, and may comprise any rotor assembly known to those of skill in the relevant art that is capable of producing energy from fluid flow.

Embodiments of the system may optionally include the addition of multiple similar components, e.g., two or more heat exchangers, two or more compressors, two or more combustors, two or more water separators, two or more turbines, two or more coal gasifiers, etc., for enhancing the efficiency, productivity, etc., of the system. For instance, the system may be best configured in certain aspects to minimize or substantially eliminate thermal heat loss. Accordingly, in some aspects, two (or more) heat exchangers are incorporated into the system, whereby the heat exchanger of the system described in the foregoing is a first heat exchanger, and the system further comprises a second heat exchanger that may be arranged or positioned downstream from the first heat exchanger and upstream of the one or more processing components described above.

The use of a second heat exchanger may beneficially increase the efficiency of the system with regards to further cooling the combustion product stream. The second heat exchanger may be arranged or positioned, in some embodiments, to receive the hydrogen gas stream, and configured to heat the hydrogen gas stream with heat energy isolated from the combustion product stream described above. In alternative embodiments, one or more additional heat exchangers, e.g., a third heat exchanger, may be added to the system for further extracting heat energy from the streams produced therein, including the combustion product stream, as well as increasing the efficacy of the disclosed systems and methods. For instance, one or more heat exchangers may be employed for systems and methods where, for example, additional heating of a combustion product stream may be beneficial, such as for superheating the water fraction of the combustion product stream.

The choice of metal ore for use in the disclosed system is not particularly limiting and may, in non-limiting aspects, comprises one or more of iron ore, chromium ore, cobalt ore, nickel ore, aluminum ore, titanium ore, manganese ore, and vanadium ore, as well as combinations of the aforementioned ores and/or ores that comprise one or more of the foregoing metals. In further aspects, the system may be equipped or modified to produce melts from recycled or reclaimed metallic products, waste, scrap ore, etc. Aspects of the system that beneficially provide for the partial or the complete capture of carbon dioxide ($CO_2$) produced during system operation can provide potential opportunities for recycling, reclaiming, and/or reprocessing metallic and semi-metallic feedstocks that may otherwise, for example, need to be discarded as deleterious waste products.

In some embodiments, a method for molten metal production is provided, the method comprising: 1) combusting a fuel with an oxidant in the presence of a metal ore and a reducing gas in a reactor for producing at least a molten metal product, a top gas including carbon dioxide ($CO_2$), and a combustible component; 2) passing at least a portion of the top gas that includes $CO_2$ to a combustor that is arranged or positioned downstream from the reactor so that the top gas comprising $CO_2$ is fully or sufficiently combusted to produce a combustion product stream; 3) passing at least a portion of the combustion product stream to a heat exchanger arranged downstream of the combustor for removing heat therefrom to provide a cooled combustion product stream; and 4) passing the cooled combustion product stream to one or more processing components arranged downstream of the heat exchanger and configured to capture carbon dioxide ($CO_2$) from the cooled combustion product stream.

Fuels for use in the disclosed method may be characterized, in certain aspects, by a high carbon content and may comprise one or more of coke, petcoke, coke dust and related carbonaceous fuel sources. While the disclosed method is not limited to a particular temperature range, temperature(s) sufficient for melting one or more metal ores are generally employed. For example, the disclosed method may be performed at temperatures capable of combusting a solid fuel, including the high carbon content fuels described above, in the presence of an oxidant, including temperatures in a range of about 800° C. to about 2,000° C., including about 1,200° ° C. to about 2,000° C., and about 1,400° C. to about 1,800° C. In related aspects, combustion of the solid fuel is further performed at ambient or greater pressures, e.g., in a range of about 1 bar to about 10 bars.

In certain aspects, combustion of the solid fuel in accordance with the disclosed method may beneficially be supplemented with a combustible gas. Accordingly, embodiments of the methodology may include, prior to combusting a solid fuel in the presence of an oxidant, injecting a combustible gas such as hydrogen ($H_2$) gas into the reactor. The method may, in further aspects, comprise cooling the product stream, e.g., to a temperature of about 20° C. to about 200° C. prior to removing the endogenous water present in the stream. In additional embodiments, the combustion product stream may comprise particulates produced during combustion of the solid fuel that may be partially or completely recovered and recycled back to the reactor for incineration in the reactor during a subsequent production process.

The following includes definitions of various terms and phrases used throughout this specification.

The terms "about" or "approximately" are defined as being close to as understood by one of ordinary skill in the art. In one non-limiting embodiment the terms are defined to be within 5%, within 1%, or within 0.5% of the stated amount.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 5%, within 1%, or within 0.5% of the stated range.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The systems and methodologies of the present disclosure can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present disclosure will become apparent from the following figures, detailed description, and examples. It should be understood, however, that the figures, detailed description, and examples, while indicating specific embodiments of the disclosure, are given by way of illustration only and are not meant to be limiting. Additionally, it is contemplated that changes and modifications within the spirit and scope of the disclosure and that can be realized based hereon are likewise encompassed by the present disclosure. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

These and other features, aspects, and advantages of the disclosure will become better understood with regard to the following descriptions, claims, and accompanying drawing. It is to be noted, however, that the drawing illustrates only several embodiments of the disclosure and, therefore, are not to be considered limiting of the scope of the disclosure.

DETAILED DESCRIPTION

The present subject matter will now be described more fully hereinafter with reference to exemplary features thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein. As used in the specification, and in the appended claims, the singular forms "a", "an", "the", include plural referents unless the context clearly dictates otherwise.

The present disclosure relates to systems useful for $CO_2$ sequestration while further providing one or more industrially useful products such as molten metal, as well as methods utilizing the disclosed systems. As a result, it is possible according to the present disclosure to produce molten metal(s) and other industrial products that are substantially or completely "$CO_2$ free," such that the molten metal(s) and other industrial products can be formed in a manner wherein substantially or absolutely no $CO_2$ is evolved or released to the atmosphere. The molten metal(s) and related industrial products are available for use in a variety of industries, such as steel, additional metallurgical uses, power generation, etc. while beneficially reducing carbon waste in the form of $CO_2$ release to the environment.

In some embodiments, the systems and methods of the present disclosure are useful for at least partially liquefying a metal or metal containing material, including metal ore, while further providing for the capture of carbonaceous species such as $CO_2$ that may be produced from the system. In certain aspects, the present systems and methods may incorporate the use of at least one reactor wherein a raw material containing a metal and/or metal ore may be at least partially liquefied in the presence of oxygen, with the subsequent evolving of $CO_2$ and other combustion components. In example embodiments, a reactor may be configured as a blast furnace for receiving a metal ore and/or metallic substrate and driving off $CO_2$. Any number of configurations may be utilized in relation to the reactor. For example, the reactor may be configured as an oxygen blast furnace, a coke blast furnace, or any other suitable configuration.

In some embodiments, the reactor may be operated a stand-alone reactor component or may be a segment or section of a reactor unit. In additional embodiments, the reactor may be operated at or above ambient pressure, such as in a range of about 1 bar to about 10 bars. In particular, the operational pressure of a reactor may be any desired value that can reasonably be achieved with a conventional blast furnace design. In further embodiments, the reactor is oxygen enriched such that an oxygen source is injected into the reactor to ensure that relevant chemical reactions proceed to completion or sufficiently close to completion in the reactor. In some embodiments, the reactor can be operated as a pressure that is around 1 bar (e.g., +10%). In additional aspects, the reactor may be equipped with one or more sensors for determining the temperature of the reactor, for analyzing the gaseous/chemical environment associated with the reactor, etc.

The reactor may, in an aspect of the disclosure, be operably connected to a source of reducing gas for use as a reactant in the reactor. For instance, the reactor may comprise a blast furnace, and any number of commercially available or known sources capable of supplying a reducing gas may be utilized.

The solid, carbonaceous fuels described herein may be burned in the reactor (or reactors) such as blast furnaces, with the resulting thermal energy utilized for the melting of the metal ore(s), metallic substrates, etc., of interest. In some embodiments, a carbon-based solid fuel may be utilized, including coke, pulverized and/or particularized coal, lignite, biomass, and related fuels. The disclosed systems may, in some aspects, further comprise one or more oxygen-forming unit(s) configured to supply oxygen to the reactor. Alternatively, or additionally, oxygen may be provided to the reactor as part of a mixed gas stream.

The systems of the present disclosure may, in some embodiments, comprise one or more combustors, including a system that comprises a single combustor arranged or positioned downstream of the reactor for most efficiently performing oxy-fuel combustion to produce a combustion product stream comprising $CO_2$ and additional combustion products such as CO and $H_2O$. In certain embodiments, the combustor is configured to receive at least a portion of the top gas produced by the reactor, and a combustible component such as a reducing gas. In related aspects, the combustible component comprises or consists essentially of hydrogen gas. While the source of the hydrogen gas may not be particularly limiting in certain arrangements of the disclosed system, in some embodiments, the hydrogen gas source is a coal gasifier in operable connection with the reactor. For instance, the coal gasifier may be in operable connection with a blast furnace and configured for producing sufficient heat energy to melt a metal ore or for producing a molten metal, for producing a top gas including carbon dioxide ($CO_2$), and for supplying (reducing) hydrogen gas to the blast furnace.

The disclosed systems may further comprise one or more heat exchangers. In accordance with aspects of the present disclosure, the heat exchangers may be configured and arranged for most effectively extracting or removing heat energy from the combustion product stream. In some embodiments, the system may comprise one or more heat exchangers configured to cool the combustion product stream to an initial temperature of about 10° C. to about 200° C., including about 20° C. to about 150° C. to produce a cooled combustion product stream, which may be subsequently filtered and compressed.

In certain aspects, the disclosure provides for systems and methods for the production of useful industrial materials or products, which are produced in combination with the beneficial capture of carbon-based species that would otherwise be vented or disposed to the environment. For instance, embodiments of the disclosed system are beneficially associated with the production of molten metals and/or metal containing melts, while the combustion stream (s) resulting from the incineration of carbonaceous fuels used to provide heat energy to the system are advantageously sequestered in accordance with, e.g., carbon capture utilization and sequestration (CCUS) methodologies and strategies known to those of skill in the art.

In one or more embodiments of the disclosure, the systems and methods are beneficially capable of operating in the absence of one or more additional components utilized in similar, previously described technologies. For instance, aspects of the disclosed system utilize a source of reducing gas, for instance a coal gasifier capable of producing and injecting $H_2$ into the system, for preferably eliminating the use of physical solvent $CO_2$ removal units, as well as amine absorption units comprising monoethanolamine (MEA) and/or additional amine substrates capable of reacting with $CO_2$, which can problematically contribute significant cost and energy requirements, as well as increase the detrimental impact associated with environmental $CO_2$ release.

Figure 1:
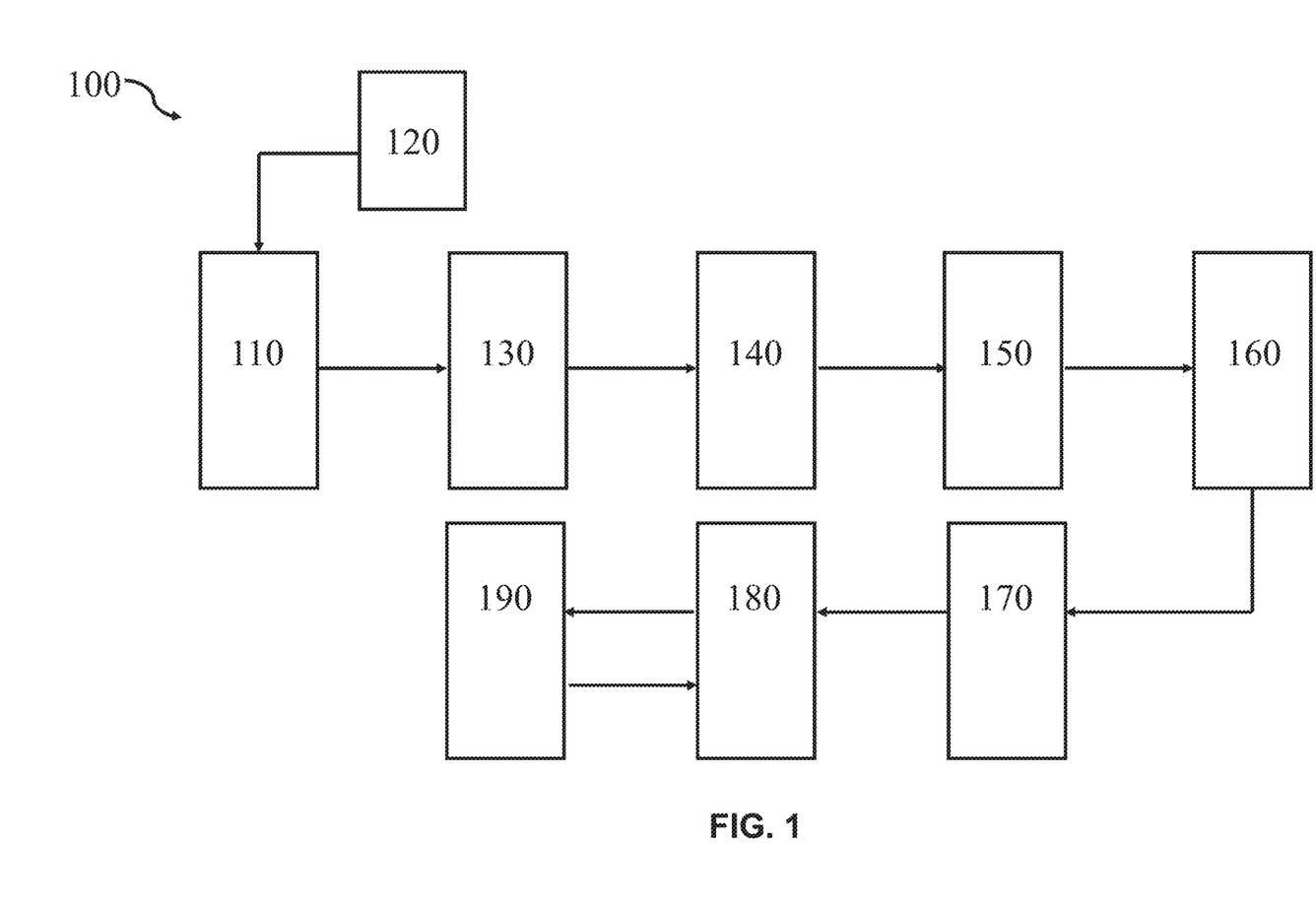
FIG. 1 shows a schematic diagram of a system for producing molten metal with carbon sequestration, according to embodiments of the disclosure.

Referring to FIG. 1, a schematic diagram of operational embodiments of the system 100, including system components for use in molten metal production in combination with carbon capture, is provided. In aspects, the system may generate heat energy for producing molten metal(s) using an oxy-fired process, utilizing a blast furnace 110 that is configured or adapted to receive a metal-based substrate for melting. In example embodiments, the metal-based substrate is metal ore selected from one or more of iron, chromium, cobalt, nickel, aluminum, titanium, manganese and vanadium. The system comprising blast furnace 110 may be further adapted or configured to operate substantially or completely as an oxidant-fueled (oxy-fuel) process, utilizing a carbonaceous fuel and a reducing gas, and integrated with post-combustion carbon capture, including $CO_2$ capture from the incineration of the carbonaceous fuel. In related aspects, oxygen and/or air may be utilized as the oxidant, coke may be utilized as the carbonaceous fuel, and hydrogen may be utilized as the reducing gas.

Although the reducing gas may be directly inserted into blast furnace 110 using, e.g., a commercial gas line such as a hydrogen gas line, embodiments of the system provide for a coal gasifier 120 configured or adapted to directly supply reducing gas such as hydrogen gas to blast furnace 110. In some embodiments, a coal gasifier such as coal gasifier 120 may be operated at a temperature in a range of about 500° C. to about 1500° C., and may be modified based on environmental conditions, the type of coal used as a substrate, etc. In further aspects, a coal gasifier such as coal gasifier 120 may be positioned or configured for most efficiently injecting $H_2$ into a reactor such as blast furnace 110. In related embodiments, an $H_2$ stream may be filtered prior to injection into a reactor such as blast furnace 110 for optimizing the combustibility of the $H_2$ stream.

Coal gasifier 120, in certain aspects, may be in further operable connection with one or more of a carbon monoxide (CO) shift reactor, a pressure swing adsorber (PSA), or additional components (not shown) capable of improving the performance or efficiency of coal gasifier 120. For instance, a pressure swing adsorption (PSA) unit (not shown) may be incorporated into the system and arranged downstream from coal gasifier 120. The combustion of the fuel, oxidant, and reducing gas may proceed substantially to completion or to completion for producing a top gas that comprises carbon dioxide ($CO_2$), carbon monoxide (CO), and hydrogen gas.

The top gas may be passed or injected into a combustor 130 that, in some embodiments, is arranged downstream of blast furnace 110. Combustor 130 may operate, in certain aspects, as an oxy-fuel combustor, and may be configured or adapted to receive and combust the top gas for producing a combustion product stream accordingly. Combustor 130 may, in certain aspects, be configured or adapted to heat the $CO_2$ fraction of the combustion product stream for power generation to beneficially produce excess power as a by-product of the disclosed system. The combustion product stream may be passed or injected from combustor 130 to a heat exchanger 140. Heat exchanger 140 is, in aspects, arranged downstream and configured or adapted for receiving the combustion product stream from combustor 130 and producing a cooled combustion product stream comprising $CO_2$. While the system 100 depicts heat exchanger 140 as consisting of a single component, certain arrangements or configurations of the disclosed system may beneficially comprise additional heat exchangers, either arranged downstream from heat exchanger 140 or in parallel with heat exchanger 140, for improving or optimizing heat removal from the combustion product stream to produce a cooled combustion product stream comprising $CO_2$.

Additional components may be incorporated into system 100, in some embodiments, for further treating and compressing the cooled combustion product stream comprising $CO_2$. For instance, the cooled combustion product stream may be passed or injected from heat exchanger 140 into filtering component 150, which may be arranged downstream of heat exchanger 140 and configured or adapted to filter adventitious filtrates from cooled combustion product stream. The filtrates may be particulate or gaseous in nature and, in some embodiments, particulate filtrates suitable for use as carbonaceous fuel may be recovered and re-introduced into blast furnace 110. Additional optional components may include compressor 160, which may be arranged downstream of filtering component 150 and configured or adapted to compress the cooled combustion product stream comprising $CO_2$. Compressor 160 may, in some embodiments, compress the cooled combustion product stream to a relatively high pressure, e.g., to a pressure of about 2-3 bars or greater. In some embodiments, the filtering components 150 may be positioned upstream of the combustor 130 so that the filtering component 150 may filter the top gas emitted from the blast furnace 110.

The cooled combustion product stream, which comprises $CO_2$ as well as water, may then be passed to an optional water separator or water scrubber such as water separator 170 for removal of the water fraction of the cooled combustion product stream. In some embodiments, water separator 170 is arranged downstream from compressor 160 and configured or adapted to produce a cooled combustion product stream that is essentially anhydrous and characterized by a pure or substantially pure $CO_2$ product stream. In some embodiments, the substantially pure $CO_2$ product stream produced by water separator 170 may beneficially be compressed to a greater pressure as compared, for example, to the cooled combustion product stream comprising both $CO_2$ and water. In additional aspects, the water and any water-soluble components removed from the cooled combustion product stream by water separator 170 may be vented to the atmosphere or otherwise evacuated from water separator 170 without deleteriously venting $CO_2$ to the atmosphere.

In related embodiments, further or additional compressors may optionally be incorporated into the systems, including compressor 180. Compressor 180 may be arranged or positioned downstream of water separator 170, and configured or adapted to receive the substantially pure $CO_2$ product stream from water separator 170 for compressing the same. The substantially pure $CO_2$ product stream, which is anhydrous or essentially anhydrous following treatment by water separator 170, may be compressed to a significantly greater pressure as compared to the cooled combustion product stream described in the foregoing. In some embodiments, the substantially pure $CO_2$ product stream comprises a $CO_2$ concentration of no less than about 50% by volume. For example, the substantially pure $CO_2$ product stream may be compressed, in some aspects, to a pressure of about 5 bars or greater, including about 10-15 bars.

In non-limiting aspects, the compressed, substantially pure $CO_2$ product stream produced by compressor 180 may be used to carry out a power production cycle, e.g., for offsetting a portion of the energy requirements associated with operating system 100. For example, a heat exchanger (not shown) may be positioned downstream of compressor 180 and configured or adapted to receive the compressed, substantially pure $CO_2$ product stream from compressor 180 and heat the compressed, substantially pure $CO_2$ product stream. The heated, substantially pure $CO_2$ product stream may subsequently be passed or injected into a combination of power production cycle components 190 to generate power and produce an expanded working fluid in the form of an expanded, substantially pure $CO_2$ product stream. Power production cycle components 190 may optional be in operable contact with compressor 180, and configured or adapted to pass or inject the expanded, substantially pure $CO_2$ product stream back to compressor 180. In aspects, power production cycle components 190 that are configured or adapted to pass or inject the expanded, substantially pure $CO_2$ product stream back to compressor 180 may include, for instance, a turbine. In some embodiments, the power production components 190 may not pass the $CO_2$ product stream back to the compressor 180 and may instead utilize a separate pump or compressor to recirculate the $CO_2$ product stream therein.

In further aspects, one or more sensors may be disposed within or throughout the system 100 and/or in proximity to one or more of each of the components and/or optional components. The sensors may be in signal communication with a controller or one or more controllers (not shown). The sensors may provide various characteristics of the system 100, such as pressure and/or temperature, to the controller, the one or more controllers, and/or other computing devices (not shown).

Figure 2:
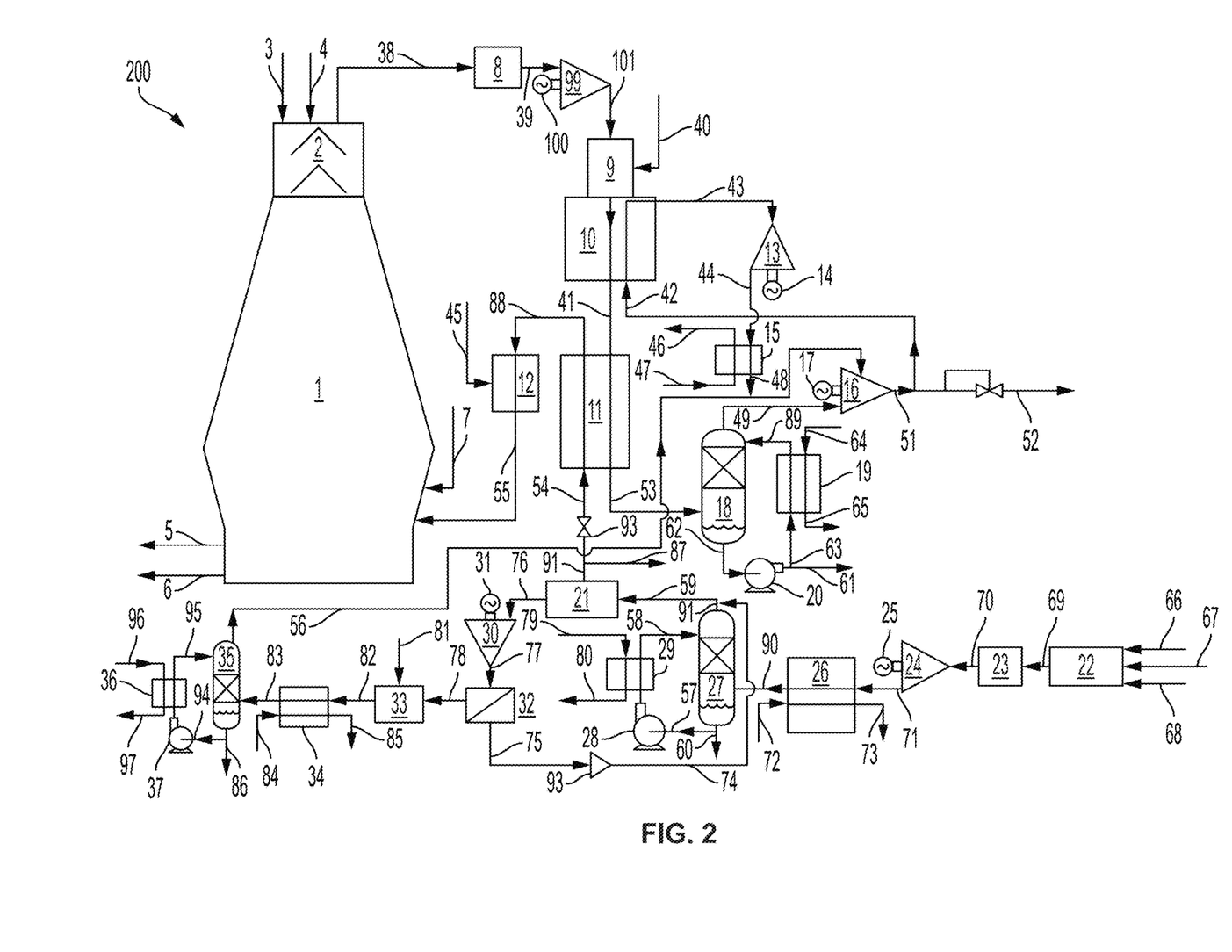
FIG. 2 shows a schematic diagram of an alternative system for producing molten metal with carbon sequestration, in accordance with embodiments of the disclosure.

FIG. 2 illustrates an example embodiment including a configuration of parts useful for carrying out the presently disclosed systems and methods for molten metal production in combination with carbon capture. The configuration 200 of FIG. 2 is useful to illustrate a fully functional and working embodiment for purposes of full disclosure of the present systems and methods. It is understood, however, that further fully functional and working embodiments can include a greater number of parts, a lesser number of parts, and/or various rearrangements of parts, and such further embodiments can be envisioned in light of the present disclosure and the discussion herein of the use and function of the various parts. The following discussion of FIG. 2 provides various parameters for operational aspects of combined parts, and such parameters are provided in relation to specific values in order to illustrate ranges of values that can be useful, and it is understood that specific values included in the following discussion do not limit the disclosure to only the specifically described values but also include ranges surrounding the specifically listed values.

In one or more embodiments, a blast furnace 1 is charged with a coke stream 3 and a pelleted iron ore/limestone stream 4 using a feeding system such as a lock hopper system 2. A top gas emanating from blast furnace 1 may, in certain aspects, comprise a gaseous mixture of $CO_2$, $H_2O$, CO, $H_2$, as well as trace amounts of nitrogen ($N_2$) and argon (Ar), which may be referred to as a "top gas." The $CO_2$ fraction in the top gas may, in some aspects, be subsequently removed from the gaseous mixture, with the resulting reducing gas comprising CO and/or $H_2$ injected into the base of blast furnace 1. The base of blast furnace 1 may be charged with a $H_2$ stream 55 (at a temperature in a range of about 1100° C. to about 1300° C., including about 1200° C.), and further charged with an oxygen stream 7. In some embodiments, oxygen stream 7 is optionally diluted with $CO_2$ at a concentration of between about 10 mol. % and about 90 mol. % with respect to $CO_2$ and supplied to blast furnace 1 at a temperature in a range of about 50° C. and about 1000° C., including a range of about 60° C. to about 850° C.

Blast furnace 1 is, in some embodiments, operable to receive, melt, and liquefy a metal ore, such as iron ore, for producing a liquid iron stream 6 and/or a liquid slag stream 5, as well as a top gas as described in the foregoing. In order to separate the $CO_2$ fraction from the top gas, and for beneficially avoiding the use of one or more costly amine unit(s) that are characterized by high energy consumption, the top gas may be combusted in a combustor, such as an oxy-fuel combustor, that primarily yields $CO_2$ and $H_2O$, along with traces of residual $N_2$. For instance, the top gas may be transferred from blast furnace 1 using blast furnace outlet stream 38, where the top gas is at a pressure in a range of about 0.5 bar to about 3.5 bar, and filtered via passage through a filter unit 8.

In further embodiments, a filtered top gas outlet stream 39 may be configured to carry the top gas from filter unit 8 to a compressor 99 in operable connection with an electric motor 100, where the top gas is subsequently compressed to a pressure in a range of about 2.5 bar to about 5.5 bar. The resulting pressurized top gas may be introduced, in some embodiments, to a combustor such as combustor 9 via a pressurized top gas discharge stream 101. Combustor 9 may then utilize the pressurized top gas as a fuel gas for combustion, wherein the top gas may further be combined with an oxidant such as pure oxygen supplied by an oxidant feed stream 40 for enhancing the combustion process. In some aspects, the oxidant, e.g., pure oxygen, may optionally be diluted with a carbonaceous gas such as $CO_2$ for modifying the adiabatic flame temperature of combustor 9 to a desired value. The combustor 9 may combust the top gas and the oxidant at pressures in a range from about 5-10 bar (e.g., such as 7-10 bar) and at temperatures in range of about 800° C. to about 1500° C. (including a temperature of about 1350° C.).

The resulting combustion products, at a temperature in a range of about 800° C. to about 1500° C. (including a temperature of about 1350° C.) may be passed from combustor 9, in aspects, using combustion product outlet stream 41 to a heat exchanger such as convective heat exchanger 10, with at least a portion of the thermal energy of the combustion products being released within convective heat exchanger 10 to a recycled $CO_2$ stream 42 (which, in some embodiments, may be present at a pressure in a range of about 150 bar to about 250 bar, including a pressure of about 200 bar). The transfer of thermal energy to recycled $CO_2$ stream 42, which is initially present at a temperature in a range of about 50° C. to about 70° C., including about 60° C., raises the temperature of recycled $CO_2$ stream 42 to a temperature in a range of about 800° C. to about 1000° C., such as about 900° C., to produce a heated recycled $CO_2$ stream. The heated recycled $CO_2$ stream 43, in some embodiments, may then be passed or injected into a power turbine 13 in operable connection with an electric generator 14 for generating power that may advantageously offset at least a portion of the energy requirements of the disclosed system.

Following the thermal energy transfer from heated recycled $CO_2$ stream to power turbine 14, the $CO_2$ stream, in some aspects, is passed through turbine outlet stream 44 to a heat exchanger such as convective heat exchanger 15. In some embodiments, the $CO_2$ stream may be present in turbine outlet stream 44 at a pressure in a range of about 20 bar to about 30 bar (such as about 25 bar), and at a temperature in a range of about 350° C. to about 400° C., including about 375° C. The $CO_2$ stream is passed via $CO_2$ stream outlet 48 to heat exchanger 15, where at least a portion of the thermal energy present in the $CO_2$ stream is extracted, resulting in a cooling of the $CO_2$ stream to a temperature in a range of about 20° C. to about 40° C., including a temperature of about 30° C., to produce $CO_2$ product stream 49. The thermal energy that is extracted from the $CO_2$ stream of $CO_2$ product stream 49 may, in certain aspects, be transferred via heat exchanger 15 to a liquid condensate such as liquid condensate stream 47 for producing a steam stream 46.

In subsequent embodiments, $CO_2$ product stream 49 plus the $CO_2$ stream of $CO_2$ stream outlet 48 may be combined and compressed, for example, to a pressure in a range of about 150 bar to about 250 bar, such as a pressure of about 200 bar, about 202 bar, and about 205 bar, using a compressor unit, such as a $CO_2$ multi-stage intercooled compressor unit 16, in operable connection with an electric motor 17. The resulting combinatorial $CO_2$ stream 51 may then, in some embodiments, be divided to produce the recycle $CO_2$ stream 42 described in the foregoing and a $CO_2$ product stream 52, which may subsequently be sequestered or otherwise removed from the system under pressure control. In a separate feed stream as shown in FIG. 2, the combustion product outlet stream 41 described in the foregoing may be passed or injected into a heat exchanger such as convective heat exchanger 11. Convective heat exchanger 11, in some embodiments, may be configured to extract at least a portion of the thermal energy associated with combustion product outlet stream 41 for sufficiently cooling the stream to a temperature in a range of about 30° C. to about 50° C., such as a temperature of about 40° C. The extracted thermal energy may be passed via convective heat exchanger 11 to a hydrogen ($H_2$) stream 54.

Hydrogen stream 54 may be, in certain aspects, endowed with sufficient thermal energy from convective heat exchanger 11 to heat hydrogen stream 54 to a temperature in a range of about 750° C. to about 950° C., including a temperature of about 850° C. In related embodiments, hydrogen stream 54 may be pressurized and/or maintained at a pressure in a range of about 1 bar to about 10 bar, including a pressure in a range of about 2 bar to about 5 bar. In some embodiments, hydrogen stream 54 may be passed to a hydrogen ($H_2$) outlet stream 88 and heated to a temperature in a range of about 1100° C. to about 1300° C., including a temperature of about 1200° C., via injection of a pure or essentially pure oxygen ($O_2$) stream 45 (which may optionally be heated to a temperature in a range of about 750° C. to about 950° C., such as a temperature of about 850° C., using any available heat from convective heat exchanger 11) into a combustor 12 for combustion of the gaseous components in accordance with the relevant portion of FIG. 2 to form a combustion stream and a combusted top gas stream. In some embodiments, the resulting combustion stream comprises less than about 6 mol. % water, such as about 4.5% water. The combustion stream may then be passed or injected into blast furnace 1 using a combustor outlet stream 55. In related aspects, a separate oxygen stream such as oxygen stream 7 of FIG. 2 may be further passed or injected into blast furnace 1. In further embodiments, oxygen stream 7 may be pre-heated, for instance, to a temperature 850° C. prior to entering blast furnace 1 using convective heat exchanger 11 as described in the foregoing.

The combusted top gas stream described above may be passed or injected via combusted top gas stream 53 to a fluid based cooling tower such as water cooling tower 18 (or direct contact cooler) as shown in FIG. 2. In certain aspects, the combusted top gas stream 53 may be cooled by water cooling tower 18 to ambient or near ambient temperatures, such as a temperature in a range of about 20° C. to about 50° C., e.g., a temperature of about 40° C. In some embodiments, water cooling tower 18 is configured as a packed tower and in operable connection with a water circuit cycle system comprising one or more components such as water circuit cycle components 62, 20, 63, 89, and an external cooling water circuit 64, 65. In further aspects, a combusted top gas stream comprising water and $CO_2$ may be passed or injected into combusted top gas stream outlet 49 and compressed using a compressor such as a multi-stage intercooled compressor 16.

In some embodiments, and in accordance with the relevant portion of FIG. 2, a pure hydrogen stream may be produced from a series of components comprising a coal gasifier such as coal gasifier 22. For instance, coal gasifier 22 may be in operable connection with a coal input feed 66, a water input feed 67, and an oxygen input stream 68. In some aspects, coal gasifier 22 may operate at pressures significantly greater than ambient pressure, including a pressure in a range of about 50 bar to about 150 bar, such as a pressure of about 100 bar. In additional embodiments, coal gasifier 22 may be configured to perform one or more of ash removal, water quenching, and particle filtration with respect to one or more of the input feeds/streams and the output stream such as treated gas output stream 69. Treated gas stream 69, either prior to or upon exiting coal gasifier 22, may be heated to a temperature in a range of about 200° C. to about 350° C., including a temperature of about 275° C., and subsequently transferred to a sour gas catalytic CO shift reactor 23 for producing hydrogen gas and $CO_2$.

The resulting, treated gaseous outlet stream 70, which is present at a temperature in a range of about 400° C. to about 450° C., such as a temperature of about 436° C., may subsequently be passed or injected into a turbine such as expansion turbine 24 that is in operable contact with an electric generator 25, which may beneficially generate energy to offset at least a portion of the requisite energetic requirements for the system using at least a portion of the thermal energy associated with gaseous outlet stream 71, which may be characterized by a temperature in a range of about 200° C. to about 400° C., including a temperature of about 300° C., and by a pressure in a range of about 25 bar to about 30 bar, such as a pressure of about 27 bar. In some embodiments, gaseous outlet stream 71 may then be cooled in a heat exchanger such as heat exchanger 26 in operable connection with a condensate stream such as condensate stream 72. Condensate stream 72 is, in aspects, operable to receive heat from heat exchanger 26 for producing a steam stream such as steam stream 73. In some embodiments, gaseous outlet stream 71 is passed through heat exchanger 26, then passed or injected into an exit stream such as exit gas stream 90, and subsequently passed to a cooling tower such as water cooling tower 27 in operable connection with a water circuit cycle system comprising one or more components such as water circuit components 57, 28, 29, 58, and a cooling water circuit 79, 80.

The resulting, water saturated discharge stream 91 may then, in aspects, be combined with a hydrogen-rich recycle stream 74 to provide a crude $H_2$ feed gas stream that may be passed or injected into a pressure swing adsorption (PSA) unit such as multi-bed PSA unit 21 as shown in FIG. 2. Multi-bed PSA unit 21 may be configured in some aspects to produce a pure or essentially pure $H_2$ product stream 91, which may be pressurized to a pressure in a range of about 20 bar to about 30 bar, such as a pressure of about 26 bar. The resulting pure or essentially pure hydrogen ($H_2$) 91 may, in some embodiments, be at least partially sequestered, re-directed or withdrawn from the system via $H_2$ product stream 87 to use, for instance, as a clean fuel gas for use in combustion steps or processes, such as processes and steps related to the melting of metal ores, within the disclosed system. In further aspects, any remaining $H_2$ may be reduced in pressure, for example, to a pressure in a range of about 1 bar to about 10 bar, including about 2 bar to about 5 bar, using pressure reducing valve 93. Pressure reducing valve 93 may then pass or inject $H_2$ stream 54 to a heat exchanger such as heat exchanger 11.

In further aspects, multi-bed PSA unit 21 may be operably connected to a waste gas outlet such as waste gas outlet stream 76, which may be utilized to pass or inject the carbonaceous gas fraction derived from a coal feed stream such as coal feed stream 66. The carbonaceous gas may then be compressed to a pressure in a range of about 25 bar to about 30 bar, including a pressure of about 27 bar, using a commercially available or modified compressor unit such as compressor unit 30, which is in operable contact with electric motor 31. In related aspects, compressor unit 30 may comprise a single-stage compressor unit or a multi-stage compressor unit.

Compressor unit 30 may then pass or inject the (pressurized) carbonaceous gas stream to gas discharge stream 77, which may subsequently pass or inject the stream into a separation unit such as gas separation unit 32. In some embodiments, gas separation unit 32 may be equipped with one or more membranes comprising one or more polymeric materials. Gas separation unit 32 may be configured, in some aspects, for best partitioning hydrogen from the foregoing gas stream for producing a hydrogen rich stream 75, which may comprise between about 50% $H_2$ and about 100% $H_2$, such as about 75% $H_2$ content. In some embodiments, hydrogen rich stream 75 may be present at a pressure in a range of about 1 bar to about 10 bar, such as a pressure of about 5 bar pressure. In subsequent aspects, hydrogen rich stream 75 may be compressed to a pressure in a range of about 20 bar to about 30 bar, including a pressure of about 26 bar, via injection into compressor 93.

In a separate line, a non-diffusing waste fuel gas stream 78 may be operably connected to gas separation unit 32 and subsequently passed or injected into a combustor such as combustor 33. The waste fuel gas stream may be combined with a pure or essentially pure $O_2$ stream such as pure $O_2$ stream 81 in combustor 33 to produce combustion products 82. The heat generated from the combustion process giving rise to combustion products 82 may, in some embodiments, be transferred to a condensate feed such as water feed 84 for generating a steam feed 85, where the water comprising water feed 84 may be extracted from a combustion product stream 83 by cooling the water to ambient or near ambient temperature using a water cooling tower 35 is configured as a packed tower and in operable connection with a water circuit cycle system comprising one or more components such as water circuit cycle components 94, 37, 95, and an external cooling water circuit 96, 97. In some aspects, waste fuel gas stream 78 may be preheated, for instance, using heat exchanger 34, to enhance the combustion process upon the combination of waste fuel gas stream 78 and pure $O_2$ stream 81 in combustor 33.

Other example embodiments of systems and methods for molten metal production in combination with carbon capture are contemplated herein. For instance, in some example embodiments, a system (and associated process) may include a blast furnace (e.g., blast furnace 110 previously described). The blast furnace may produce a top gas that may comprise $CO_2$, CO, and hydrogen as previously described. The top gas may be subjected to filtration (e.g., such as via filtering component 150 as previously described), and thereafter sent to a combustor (e.g., such as combustor 130 previously described). The combustion product stream emitted from the combustor may then flowed to one or more heat exchangers (e.g., such as via heat exchanger 140 previously described), whereby the combustion product is cooled and other streams may be heated (e.g., such as a $CO_2$ stream in a power cycle as described herein, a hydrogen stream, such as the stream 54, that is supplied to the blast furnace, etc.). After the combustion product stream is cooled, it may then be subjected to further cooling and water removal via a direct contact cooler (e.g., water separator 170 as previously described), so as to produce a $CO_2$ stream. Finally, the $CO_2$ stream may be sent to a power cycle, such as a semi-closed loop power cycle.

In some embodiments of the semi-closed loop power cycle, the $CO_2$ stream may be subjected to one or more heating steps using at least heat derived from the combustion of the top gas emitted from the blast furnace previously described. In addition, within the power cycle, the heated $CO_2$ stream may be expanded via a turbine or other suitable expansion system or device to generate electrical power. Further details of some further example embodiments are now described with respect to the configuration shown in FIG. 3.

Figure 3:
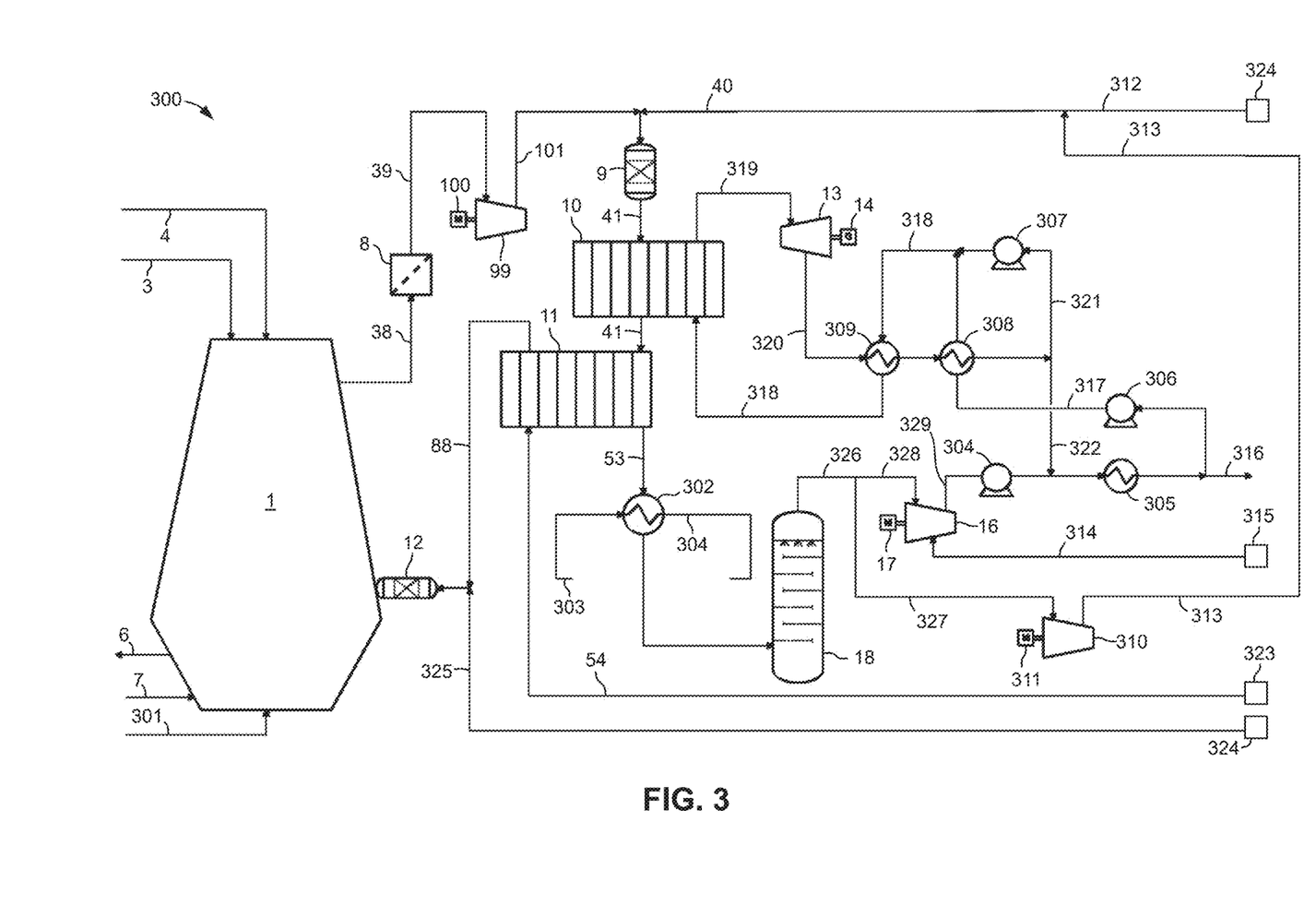
FIG. 3 shows a schematic diagram of another alternative system for producing molten metal with carbon sequestration, in accordance with embodiments of the disclosure.

Specifically, FIG. 3 illustrates another example embodiment including a configuration 300 of parts useful for carrying out the presently disclosed systems and methods for molten metal production in combination with carbon capture. The configuration 300 of FIG. 3 is useful to illustrate a fully functional and working embodiment for purposes of full disclosure of the present systems and methods. It is understood, however, that further fully functional and working embodiments can include a greater number of parts, a lesser number of parts, and/or various rearrangements of parts, and such further embodiments can be envisioned in light of the present disclosure and the discussion herein of the use and function of the various parts. The following discussion of FIG. 3 provides various parameters for operational aspects of combined parts, and such parameters are provided in relation to specific values in order to illustrate ranges of values that can be useful, and it is understood that specific values included in the following discussion do not limit the disclosure to only the specifically described values but also include ranges surrounding the specifically listed values.

The configuration 300 may be similar to the configuration 200, and thus may include at least some of the same or similar components. As a result, features and components of the configuration 300 that are shared with the configuration 200 of FIG. 2 are identified with the same reference numerals, and the discussion below will focus on the features of the configuration 300 that are different from the configuration 200.

As shown in FIG. 3, and as previously described for the configuration 200, the configuration 300 includes the blast furnace 1 that is charged with coke stream 3, pelleted iron ore/limestone stream 4, and $O_2$ stream 7. In addition, FIG. 3 shows a coal stream 301 that is provided to the blast furnace 1. For instance, the coal provided by stream 301 may be combusted (or partially combusted) within the furnace 1 during operations. Further, the hydrogen stream 54 (which may be derived from coal gasifier and/or PSA unit as previously described and generally indicated in FIG. 3 by box 323) may be combined with an $O_2$ stream 325 and combusted in combustor 12 (or reactor) to produce a combustion stream and a combusted top gas stream that is routed into the furnace 1. The blast furnace 1 may output a blast furnace outlet stream 38 (that includes top gas as previously described) and a liquid iron stream 6.

As is also previously described for the configuration 200, the furnace outlet stream 38 may routed through the filter unit 8 to produce the filtered top gas outlet stream 39 that is then compressed via the compressor 99 and then routed to the combustor 9 along the oxidant feed steam 40. In some embodiments, the filter unit 8 may comprise one or more cyclone filtering units, ceramic filter units, or other units or systems to reduce contaminants (e.g., particulates) in the furnace outlet stream 38. In some embodiments, the furnace outlet stream 38 may be at approximately 2-5 barg, and may have a temperature that is less than about 300° C. In addition, in some embodiments, the compressor 99 may increase the pressure of the filtered top gas outlet stream 39 by about 2-3 barg. Thus, in some embodiments, the compressor 99 may comprise a blower. Also, the filtered top gas outlet stream 39 may have a temperature of about 200° C. to about 400° ° C. and may be routed through a relatively large diameter pipe (e.g., which may have an inner diameter of 1 to 2 meters (m) in some embodiments).

In the configuration 300, the oxidant feed stream 40 may comprise a mixture or combination of an $O_2$ stream 312 (which may comprise at least 99.5% $O_2$ and may have a pressure of about 7 to 10 barg in some embodiments) that is provided from a suitable process or unit 324 and a $CO_2$ stream 313 that is produced from the water cooling tower 18. The suitable process or unit 324 may also produce the oxygen stream 54 that is fed to combustor 12, and may include a large cryogenic air separation unit in some embodiments. As previously described, mixing the $CO_2$ stream 313 with the oxygen stream 312 to form the oxidant stream 40 may modify the adiabatic flame temperature of the combustor 9 to a desired value. For instance, in some embodiments, the oxidant stream 40 may have about 23 vol % $O_2$ and about 77 vol % $CO_2$, and the combustion temperature achieved within the combustor 12 may be about 1350° C. In some embodiments, the lowered $O_2$ level or amount may preclude the need for additional hazard and operability considerations for the piping that receives the oxidant stream 40.

In some embodiments, the combustor 9 may include a plurality of combustors that achieve a sensible gas velocity of about 30 meters per second (m/s). The plurality of combustors may be positioned in parallel to one another so that the filtered top gas outlet stream 39 and/or the oxidant stream 40 may be split into a plurality of parallel streams that may be individually controlled within the combustor 9. Similarly, the oxidant feed stream 40 may also be split so as to feed the plurality of combustors. Without being limited to this or any other theory, including a plurality of parallel combustors in the combustor 9 may allow the combustor 9 to run at reduced capacity by simply not utilizing one or more of the parallel combustors, and may provide redundancy in case one or more of the parallel combustors is shut down (e.g., for maintenance, failure, etc.). In addition, multiple, parallel combustors may be individually controlled so as to account for variations in the top gas outlet stream 39.

The combustion product outlet stream 41 is then routed through the convective heat exchanger 10 and then the convective heat exchanger 11 to transfer heat to other streams as previously described for configuration 200 (such a $CO_2$ stream that is circulated through the power generation cycle as described in more detail below and the hydrogen stream 54, respectively). In some embodiments, the combustion product outlet stream 41 may enter the convective heat exchanger 10 at a pressure of about 7-10 barg and a temperature of about 1200-1400° C., and may exit the convective heat exchanger 10 at a temperature of about 100° C. In addition, in some embodiments, the combustion product outlet stream 41 may be further cooled in the convective heat exchanger 11 to about 85° C.

The resulting combusted top gas stream 53 emitted from the convective heat exchanger 11 is then flowed to the water cooling tower 18 as previously described; however, before entering the water cooling tower 18, the combusted top gas stream 53 may be routed through another heat exchanger 302 whereby additional heat is transferred from the combusted top gas stream 53 to a boiler feed water stream 303 to thereby produce a steam stream 304. The combusted top gas stream 53 is then flowed to the water cooling tower 18, where it is further cooled to produce a cooled $CO_2$ stream 326 as previously described. In some embodiments, the combusted top gas stream 53 may be cooled in the water cooling tower 18 to about 20° C. Thus, in some embodiments, the water cooling tower 18 may at least partially condense sulfur oxide ($SO_x$) and/or nitric oxide (NOx) from the combusted top as stream 53 to their respective acids, and therefore, the water cooling tower 18 may include a corrosion resistant lining. While not shown, an additional water stream may be produced from the water cooling tower 18 that is at least partially recycled therethrough as previously described for the configuration 200 (see water circuit cycle components 62, 20, 63, 89, and an external cooling water circuit 64, 65 shown in FIG. 2).

The cooled $CO_2$ stream 326 exiting water cooler tower 18 may be split to produce a first $CO_2$ stream 327 and a second $CO_2$ stream 328. The first $CO_2$ stream 327 is compressed via a compressor 310 driven by a motor 311 to provide the $CO_2$ stream 313 that is combined with the $O_2$ stream 312 to form the oxidant feed stream 40 as previously described.

The second $CO_2$ stream 328 may be sent to a semi-closed loop power cycle. In particular, the second $CO_2$ stream 328 may be routed to the compressor unit 16. As previously described, the compressor unit 16 may receive additional $CO_2$ stream 314 from additional sources 315 (such as from a waste gas emitted from the PSA unit 323 utilized to produce the hydrogen stream 54 as previously described). As previously described, the compressor unit 16 may comprise a multi-stage intercooled compressor that may include an aftercooler. In addition, water may be removed from the compressed $CO_2$ stream between the stages of the compressor unit 16. A compressed $CO_2$ stream 329 may be produced from the compressor unit 16 that may have a pressure of about 80 barg in some embodiments. Thereafter, the compressed $CO_2$ stream 329 may be further pressurized via a pump 304 (e.g., to about 107 barg in some embodiments).

The compressed $CO_2$ stream 329 may be further cooled via a heat exchanger 305 and then split into a $CO_2$ product or output stream 316 and a recycle $CO_2$ stream 317 that is routed to the semi-closed loop power cycle. The $CO_2$ product stream 316 may subsequently be sequestered or otherwise removed from the system under pressure control. The recycle $CO_2$ stream 317 is routed through a pump 306 to further increase its pressure, and then through a first or low temperature recuperative heat exchanger 308 to preheat the recycle $CO_2$ stream. The recycle $CO_2$ stream 317 may then be combined with a further recycle $CO_2$ stream 321 to form a combined $CO_2$ stream 318, which is then routed through a high temperature recuperative heat exchanger 309. The further heated, combined $CO_2$ stream 318 is then provided to the convective heat exchanger 10, where the combined $CO_2$ stream 318 is further heated via the heat from combustion product outlet stream 41 output from combustor 9 so as to produce a high temperature $CO_2$ stream 319 that is expanded through the turbine 13 to actuate generator 14 and thereby produce electrical power as previously described.

An expanded $CO_2$ stream 320 is emitted from the turbine 13 and is then flowed through the high temperature recuperative heat exchanger 309 and low temperature recuperative heat exchanger 308 to exchange heat with the combined $CO_2$ stream 318 and recycle $CO_2$ stream 317, respectively. Thereafter, the expanded, and now cooled $CO_2$ stream 320 is split into the further recycle $CO_2$ stream 321 and a makeup $CO_2$ stream 322 that is combined with the compressed $CO_2$ stream 329 downstream of pump 304 and upstream of heat exchanger 305. The further recycle stream $CO_2$ stream 329 may then be combined with the recycle stream 317 downstream of the low temperature recuperative heat exchanger 308 to form the combined $CO_2$ stream 318 as previously described.

In the following description, some example temperatures and pressures of the fluids flowing through the semi-closed power cycle of configuration 300 are provided. However, it should be appreciated that other example embodiments may achieve different operating temperatures and pressures, and therefore the following examples are merely illustrative of some potential embodiments.

For instance, in some embodiments, the combined $CO_2$ stream 318 may be at about 200 barg to about 285 barg and may be heated in the high temperature recuperative heat exchanger 309 to about 400° C. to about 500° C. Thereafter, the combined $CO_2$ stream 318 may be further heated in the convective heat exchanger 10 (via heat exchanger with the combustion product outlet stream 41) to produce the high temperature $CO_2$ stream 319 at about 550° C. to about 600° C. or even higher. For instance, in some embodiments, the high temperature $CO_2$ stream 319 may have a temperature of about 625° C. and a pressure of about 278 barg.

In some embodiments, the temperature of the expanded $CO_2$ stream 320 may exit the turbine 13 at a pressure of about 107 barg and a temperature of about 504° C. Thereafter, the temperature of the expanded $CO_2$ stream 320 may be further reduced in the high temperature recuperative heat exchanger 309 to about 154° C., and then is further reduced again in the low temperature recuperative heat exchanger 308 to about 61° C. Thereafter, the further recycle $CO_2$ stream 321 may be increased in pressure to about 280 barg via the pump 307 and then combined with the recycle $CO_2$ stream 317 as previously described. Also, the makeup $CO_2$ stream 322 may be combined with compressed $CO_2$ stream 329, cooled to about 25° C. in the heat exchanger 305, and then the resulting recycle $CO_2$ stream 317 is pressurized to about 280 barg via the pump 306 and heated to about 450° C. in the low temperature recuperative heat exchanger 308.

Table 1 provides for a non-limiting dissemination of fuel, gas, and energy requirements, as well as the energy produced within certain components and processes, of the system in accordance with certain embodiments:

TABLE 1

| | |
|---|---|
| Dry Coke Requirement (kg) | 353 |
| Hydrogen Requirement (Nm$^3$) | 816 |
| Oxygen Injected into Blast Furnace (1) (Nm$^3$) | 300 |
| Oxygen Consumed in Combustor (9) (Nm$^3$) | 702 |
| Oxygen Consumed in Combustor (12) (Nm$^3$) | 20 |
| Total Oxygen Consumption (Nm$^3$) | 1022 |
| Turbine Power Output (kW) | 824 |
| Total Power Requirement (including O$_2$ plant) (kW) | 700 |
| Surplus Power Produced (kW) | 124 |
| Bituminous Coal Utilized for H$_2$ Production (kg) | 500 |

Figure 4:
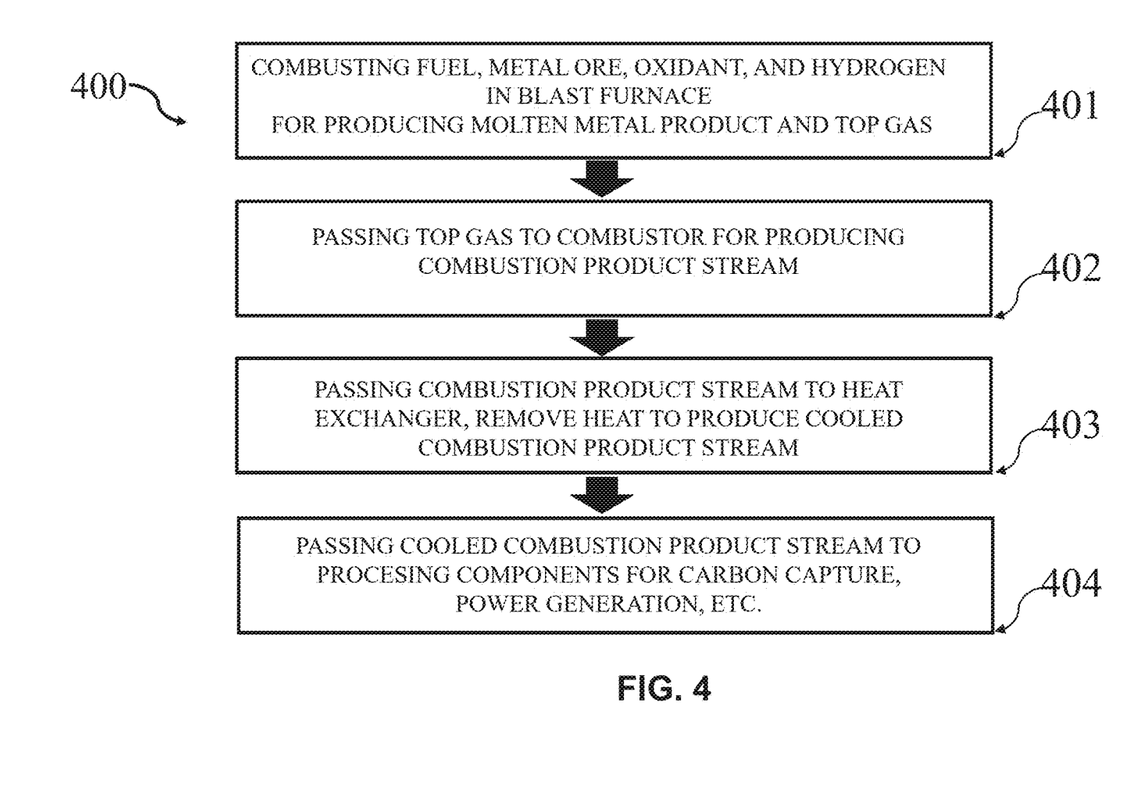
FIG. 4 shows a schematic diagram of a method for producing molten metal with carbon sequestration, according to embodiments of the present disclosure.

FIG. 4 shows a schematic diagram of a method 400 for molten metal production and carbon sequestration, according to embodiments of the disclosure. The method 400 is detailed with reference to the system 100 of FIG. 1. Additional systems may be utilized in relation to the method 400. The order in which the operations are described is not intended to be construed as a limitation, and any number of the described blocks may be combined in any order and/or in parallel to implement the methods.

At block 401, a fuel, a metal ore, an oxidant, and a reducing gas may be introduced to the system 100. In certain aspects, one or more of the fuel, the metal ore, the oxidant, and/or the reducing gas may be introduced continuously for particular and/or specified periods of time. In an example embodiment, prior to the fuel, the metal ore, the oxidant, and/or the reducing gas entering the system 100, components of the system such as blast furnace 110 may be preheated or preconditioned. In another embodiment, the fuel, the metal ore, the oxidant, and/or the reducing gas may be introduced at the same or substantially the same time as the system 100 is initially operated. In aspects, the fuel, the metal ore, the oxidant, and the reducing gas are supplied to blast furnace 110 for producing a molten metal product and a top gas comprising carbon dioxide (CO$_2$) and a combustible component.

At block 402, once the molten metal product and top gas have been formed, the top gas may be passed or injected into a combustor such as combustor 130 for combusting the top gas, as well as any additional combustible components that may be introduced into combustor 130 with the top gas, for combustion of the top gas and combustible components for producing a combustion product stream. The top gas et al. may be combusted at any temperature for combusting or substantially combusting the top gas and associated combustible components, including temperatures in a range of about 800° C. to about 2,000° C., such as about 1,200° C. to about 2,000° C., and about 1,400° C. to about 1,800° C., for producing a combustion product stream. In certain embodiments, the combustion product stream comprises at least about 20% by volume carbon dioxide (CO$_2$), and further comprises one of more of variable concentrations of hydrogen (H$_2$), nitrogen (N$_2$), carbon monoxide (CO), and water (H$_2$O), e.g., the combustion product stream may comprise about 32% by volume CO$_2$, about 45% by volume CO, about 5% by volume H$_2$, about 14% by volume N$_2$, and about 1% by volume H$_2$O.

At block 403, the combustion product stream is passed or injected into a heat exchanger such as heat exchanger 140. In aspects, heat exchanger 140 may be configured or adapted to remove or transfer heat energy from the combustion product stream that, in some embodiments, may be incorporated into a power generation cycle for reducing the external energy requirements for system 100.

At block 404, the cooled combustion product stream may be passed or injected into one or more additional components operable with system 100, including but not limited to filter component 150, compressor 160, water separator 170, compressor 180, and/or turbine 190. In some embodiments, one or more of the optional foregoing components may be utilized, e.g., for improving the utility of the cooled combustion product stream for one or more compression steps or processes, for utilizing the cooled combustion product stream, or streams derived therefrom such as a substantially pure CO$_2$ product stream, in power generation cycles or loops associated with system 100, etc., in accordance with the foregoing. In some embodiments, the top gas may be routed through one or more of the additional components (such as for instance, the filter component 150) upstream of the combustor 130.

Although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

The invention claimed is:

1. A method for molten metal production comprising:
   combusting a fuel in the presence of a metal ore and a reducing gas in a reactor for producing at least a molten metal product and a top gas including carbon dioxide (CO$_2$) and a combustible component;
   passing at least a portion of the top gas to a combustor arranged downstream of the reactor so that the top gas is combusted with an oxidant in the combustor to provide a combustion product stream;
   passing at least a portion of the combustion product stream through one or more heat exchangers arranged downstream of the combustor to remove heat therefrom and to provide a cooled combustion product stream;
   passing the cooled combustion product stream to one or more processing components arranged downstream of the heat exchanger and configured to capture CO$_2$ from the cooled combustion product stream; and
   recycling at least a portion of the captured CO$_2$ to the combustor.

2. The method of claim 1, wherein combusting the fuel is performed at a temperature of about 1,200° C. to about 2,000° C.

3. The method of claim 1, wherein combusting the fuel is performed at a pressure in a range of about 1 bar to about 10 bars.

4. The method of claim 1, wherein, prior to combusting the fuel, the method further comprises injecting hydrogen (H$_2$) gas into the reactor.

5. The method of claim 1, wherein the combustion product stream is cooled to a temperature of about 20° C. to about 200° C.

6. The method of claim 1, further comprising removing solids from the top gas before passing the top gas to the combustor.

7. The method of claim 1, wherein recycling the at least the portion of the captured $CO_2$ to the combustor comprises recycling a first portion of the captured $CO_2$.

8. The method of claim 7, further comprising:
heating a second portion of the captured $CO_2$; and
flowing the second portion of the captured $CO_2$ through a turbine after the heating to produce electrical power.

9. The method of claim 8, further comprising combining the first portion of the captured $CO_2$ with the oxidant upstream of the combustor.

10. The method of claim 8, further comprising heating the first second portion of the captured $CO_2$ in at least one of the one or more heat exchangers via the combustion product stream before flowing the second portion of the captured $CO_2$ through the turbine.

11. The method of claim 1, further comprising flowing a hydrogen ($H_2$) stream into the reactor as the reducing gas.

12. The method of claim 11, further comprising generating the $H_2$ stream via at least a coal gasifier.

13. The method of claim 12, further comprising:
outputting a treated gas stream from the coal gasifier;
reducing a sulfur content of the treated gas stream with a catalytic shift reactor; and
providing at least a portion of the treated gas stream to a pressure swing adsorption (PSA) unit to produce the $H_2$ stream.

14. The method of claim 11, further comprising heating the $H_2$ stream in at least one of the one or more heat exchangers via the cooled combustion product stream before flowing the $H_2$ stream into the reactor.

* * * * *

UNITED STATES PATENT AND TRADEMARK OFFICE
CERTIFICATE OF CORRECTION

PATENT NO. : 12,258,640 B2  
APPLICATION NO. : 18/421103  
DATED : March 25, 2025  
INVENTOR(S) : Rodney John Allam Page 1 of 1

It is certified that error appears in the above-identified patent and that said Letters Patent is hereby corrected as shown below:

In the Specification

In Column 4, Line 53, delete "1,200° °" and insert -- 1,200° --.

In Column 7, Line 6, delete "+10%)." and insert -- ±10%). --.

In Column 16, Line 36, delete "400° °" and insert -- 400° --.

In Column 19, Line 60, delete "800° °" and insert -- 800° --.

In Column 19, Line 60, delete "1,200° °" and insert -- 1,200° --.

Signed and Sealed this  
Tenth Day of June, 2025

Coke Morgan Stewart  
*Acting Director of the United States Patent and Trademark Office*